United States Patent
Glück et al.

(10) Patent No.: US 6,340,713 B1
(45) Date of Patent: Jan. 22, 2002

(54) EXPANDABLE STYRENE POLYMERS CONTAINING GRAPHITE PARTICLES

(75) Inventors: Guiscard Glück, Mainz; Klaus Hahn, Kirchheim; Knut Kaempfer, Ludwigshafen; Dieter Naegele, Worms; Frank Braun, Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/423,613

(22) PCT Filed: May 14, 1997

(86) PCT No.: PCT/EP97/02458

§ 371 Date: Nov. 15, 1999

§ 102(e) Date: Nov. 15, 1999

(87) PCT Pub. No.: WO98/51735

PCT Pub. Date: Nov. 19, 1998

(51) Int. Cl.$^7$ .................................................. C08J 9/00
(52) U.S. Cl. ............................. 521/60; 521/79; 521/82; 521/98; 521/146; 521/56; 521/59; 521/907
(58) Field of Search ............................. 521/56, 59, 60, 521/79, 82, 98, 146, 907

(56) References Cited

U.S. PATENT DOCUMENTS

| | | | | |
|---|---|---|---|---|
| 5,783,612 A | * | 7/1998 | Batscheider et al. | 521/56 |
| 5,880,166 A | * | 3/1999 | Gluck et al. | 521/149 |
| 5,908,872 A | * | 6/1999 | Gluck et al. | 521/146 |

* cited by examiner

*Primary Examiner*—Morton Foelak
(74) *Attorney, Agent, or Firm*—Oblon, Spivak, McClelland, Maier & Neustadt, P.C.

(57) ABSTRACT

Particulate expandable styrene polymers contain homogeneously distributed graphite particles and can be processed to give self-extinguishing foams having a density of $\leq 35$ g/l.

19 Claims, No Drawings

EXPANDABLE STYRENE POLYMERS CONTAINING GRAPHITE PARTICLES

The present invention relates to particulate, expandable styrene polymers containing graphite particles, their production and foams produced therefrom.

Expanded polystyrene foams have been known for a long time and have proven themselves in many fields. Such foams are produced by foaming polystyrene particles impregnated with blowing agents and subsequently welding together the foam particles produced in this way to give moldings. A significant application area is thermal insulation in building and construction.

In many applications of foams, in particular in building and construction, it is a requirement that the foams be self-extinguishing. Although it is known that this can be achieved by addition of flame retardants, e.g. bromine compounds, whether a foam passes a particular burning test depends on various factors such as composition and density of the foam, type and amount of flame retardant and also type and amount of further additives.

The foam boards made of expanded polystyrene foam which are used for thermal insulation usually have densities of at least 30 g/l, since the thermal conductivity of the expanded polystyrene foam has a minimum at these densities. To save material, it would be desirable to use foam boards having lower densities, in particular $\leq 15$ g/l, for thermal insulation. The production of such foams is not a problem in technical terms. However, such foam boards having a lower density have a drastically worse thermal insulation performance, so that they do not meet the requirements for thermal conductivity class 035 (DIN 18 164, Part 1).

It is known that the thermal conductivity of foams can be reduced by incorporation of athermanous materials such as carbon black, metal oxides, metal powder or pigments.

Thus, EP-A 372 343 describes polystyrene foams containing from 1 to 25% by weight of carbon black. The carbon black has a particle size of from 10 to 100 nm and a surface area of from 10 to 1500 $m^2/g$. The polystyrene foams described there are predominantly produced by the extrusion method and preferably have a density of 32–40 g/l, as is typical for these foams. The addition of flame retardants is mentioned, but the expanded polystyrene foams described in the examples containing 1.7% by weight of hexabromocyclododecane do not pass the burning test B2 in accordance with DIN 4102.

WO 94/13721 describes similar foams in which the size of the carbon black particles is >150 nm.

EP-A 620 246 describes moldings made of expanded polystyrene foam which contain a particulate athermanous material, in particular carbon black, and also graphite. The density of the moldings is less than 20 g/l. The particles are preferably incorporated into the moldings by surface coating of the prefoamed polystyrene beads or by embedding into the not yet foamed polystyrene granules. However, this distribution of the particles on the surface leads to severe impairment of the welding together of the prefoamed beads and consequently to foams of low quality; in addition, the particles can be rubbed off from the surface of the molding. In both cases, the particles are in any case not homogeneously distributed in the interior of the polystyrene particles; an addition of flame retardants is not described.

A similar process is described in GB-A 1 588 314, according to which antistatic polystyrene foams are produced by coating unfoamed or prefoamed particles with a graphite suspension.

It is an object of the present invention to provide expandable styrene polymers containing graphite particles which can be processed to give expanded polystyrene foams which have both a low density and a low thermal conductivity and have good processing properties, good physical properties and, in particular, very good flame retardant properties.

We have found that this object is achieved by particulate, expandable styrene polymers containing homogeneously distributed graphite particles and can be processed to give foams which have a density of <35 g/l and are preferably self-extinguishing and pass the burning test B2 (in accordance with DIN 4102).

The invention also provides processes for producing the expandable styrene polymers and also provides the expanded polystyrene foams produced therefrom.

For the purposes of the present invention, expandable styrene polymers are styrene polymers containing blowing agents.

The polymer matrix present in the expandable styrene polymers of the present invention is, in particular, homopolystyrene or a styrene copolymer containing up to 20%, based on the weight of the polymers, of ethylenically unsaturated comonomers, in particular alkylstyrene, divinylbenzene, acrylonitrile or α-methylstyrene. Blends of polystyrene and other polymers, in particular with rubber and polyphenylene ether are also possible.

The styrene polymers can contain the customary and known auxiliaries and additives, for example flame retardants, nucleating agents, UV stabilizers, chain transferrers, blowing agents, plasticizers, pigments and antioxidants.

The expandable particles are coated with the customary and known coating materials, for example metal stearates, glyceryl esters and finely divided silicates.

The particle size is preferably in the range 0.2–2 mm.

The graphite used preferably has a mean particle size of from 1 to 50 $\mu$m, in particular from 2.5 to 12 $\mu$m, a bulk density of from 100 to 500 g/l and a specific surface area of from 5 to 20 $m^2/g$. Either natural graphite or milled synthetic graphite can be used. The graphite particles are preferably present in the styrene polymer in amounts of from 0.05 to 25% by weight, in particular from 2 to 8% by weight. Surprisingly, it has been found that graphite particles are effective even in amounts of less than 0.5% by weight.

A problem associated with the use of graphite particles is the ready flammability of the expanded polystyrene foams containing graphite particles. Thus, graphite-containing polystyrene foams have hitherto not been able to pass the burning tests required for use in building and construction (B1 and B2 in accordance with DIN 4102).

To rectify this defect, flame retardants, particularly ones based on organic bromine compounds, are added to the expandable styrene polymers in a preferred embodiment of the invention. The bromine compound (without a synergist) should be added in an amount of more than 3% by weight, based on the weight of the expandable styrene polymers. B1 and B2 are not passed when the customary amount of flame retardant is used. The organic bromine compounds should have a bromine content of $\geq 70\%$ by weight.

Surprisingly, this amount of flame retardants leads to no deterioration whatever in the mechanical properties of the expanded polystyrene foams containing carbon black.

Particularly suitable flame retardants are aliphatic, cycloaliphatic and aromatic bromine compounds, for example hexabromocyclododecane, pentabromomonochlorocyclohexane and pentabromophenyl allyl ether.

The effect of the bromine-containing flame retardants is considerably improved by addition of C—C- or O—O-labile organic compounds. Examples of suitable flame retardant synergists are bicumyl and dicumyl peroxide. A preferred combination comprises 0.6 to 5% by weight of an organic bromine compound and 0.1 to 1.0% by weight of the C—C- or O—O-labile organic compound.

The expandable styrene polymers of the present invention can be produced by various methods.

In a preferred embodiment, the graphite particles are mixed with a melt of the styrene polymer, preferably in an extruder. At the same time, the blowing agent is metered into the melt. The graphite particles can also be compounded into a melt of styrene polymer containing blowing agent; in this case, it is convenient to use oversize and undersize fractions of polystyrene beads containing blowing agent formed in a suspension polymerization. The polystyrene melt containing blowing agents and graphite particles is extruded and granulated to form granules containing blowing agent. Since graphite has a strong nucleating action, the compounded polystyrene should be quickly cooled under pressure after extrusion in order to avoid foaming. For this reason, an underwater granulation under pressure is advantageously carried out.

It is also possible to add the blowing agent to styrene polymers containing graphite particles in a separate process step. Here, the granules are then impregnated with the blowing agent, preferably in aqueous suspension.

In all three cases, the finely divided graphite particles can be added directly to the polystyrene melt. The graphite particles can also be added in the form of a concentrate in polystyrene. However, preference is given to introducing polystyrene granules and graphite particles together into an extruder, melting the polystyrene and mixing it with the graphite.

It is in principle also possible to incorporate the graphite particles during the course of the suspension polymerization. Here, they can be added prior to suspending the monomeric styrene or added to the reaction mixture during the course of the polymerization, preferably during the first half of the polymerization cycle. The blowing agent is preferably added during the course of the polymerization, but it can also be incorporated into the styrene polymer afterwards. Here, it has been found that it is favorable in terms of the stability of the suspension for a solution of polystyrene (or an appropriate styrene copolymer) in styrene (or the mixture of styrene with comonomers) to be present at the beginning of the suspension polymerization. Preference is given to starting from a 0.5–30% strength by weight, in particular from 5 to 20% strength by weight, solution of polystyrene in styrene. This can be achieved by dissolving fresh polystyrene in monomers, but use is advantageously made of oversize and undersize fractions which have been sieved out in the fractionation of the variously sized beads obtained in the preparation of expandable polystyrene. In practice, such otherwise unusable oversize and undersize fractions have diameters of greater than 2.0 mm or less than 0.2 mm. Recycled polystyrene and recycled polystyrene foam can also be used. Another possibility is to prepolymerize styrene in bulk up to a conversion of from 0.5 to 70% and to suspend the prepolymer together with the graphite particles in the aqueous phase and complete the polymerization.

The blowing agent is added in the customary amounts of about 3–10% by weight, based on the weight of the polymer. As blowing agents, use is usually made of aliphatic hydrocarbons having from 3 to 10, preferably from 4 to 6, carbon atoms.

The novel expandable styrene polymers containing carbon black can be processed to produce polystyrene foams having densities of 5–35 g/l, preferably from 8 to 25 g/l and in particular 10–15 g/l.

For this purpose, the expandable particles are prefoamed. This is usually achieved by heating the particles by means of steam in prefoamers.

The particles which have been prefoamed in this way are then welded together to give moldings. For this purpose, the prefoamed particles are introduced into molds which do not close in a gastight manner and are treated with steam. After cooling, the moldings can be taken from the mold.

A further surprising effect of the addition of graphite particles is that it can reduce the cooling time until welded foam blocks can be removed from the mold. Thus, for example, an addition of from 0.5 to 5% by weight of graphite leads to a shortening of from 10 to 90% in the cooling time.

The foams produced from the expandable styrene polymers of the present invention have an excellent thermal insulation capacity. This effect is particularly distinct at low densities. Thus, addition of 2% by weight of graphite to an expandable styrene polymer enables the thermal conductivity at a foam density of 10 g/l to be reduced from 44 mW/m·K to less than 35 mW/m·K.

The present invention further provides expanded polystyrene foams which have a density of <35 g/l and contain from 0.05 to 25% by weight of homogeneously distributed graphite particles and whose thermal conductivity is reduced sufficiently for the foams to meet the requirements of thermal conductivity class 035 (in accordance with DIN 18 164, Part 1, Table 4) and are preferably self-extinguishing and pass the burning test B2 (in accordance with DIN 4102).

The ability to reduce the density of the styrene polymers significantly at the same thermal conductivity allows material savings to be realized. Since, compared to conventional expandable styrene polymers, the same thermal insulation performance can be achieved at significantly lower densities, the expandable polystyrene particles produced according to the present invention makes it possible to use thinner foam boards, which makes a space saving possible.

Surprisingly, the expandable styrene polymers of the present invention can be processed without any problems at all to give low-density foams. There are neither blowing agent losses nor disruptions of the cell structure of the foams, although a person skilled in the art would have to assume that the graphite would act as nucleating agent and lead to undesirably fine cells in the foam and poor welding together. In addition, self-extinguishing foams which pass the burning test B2 and in most cases also B1 can be produced despite the addition of graphite particles.

Owing to the incorporation of the graphite particles in the polymer matrix, there is no rubbing-off of the graphite and thus no soiling when working with such components.

The foams of the present invention can be used for thermal insulation of buildings and parts of buildings, for thermal insulation of machines and domestic appliances and also as packaging materials.

The invention is illustrated in more detail by the examples below. Parts and percentages are by weight.

EXAMPLE 1

In a pressure-resistant stirred vessel, 0.498 kg of oversize/undersize EPS is dissolved in 16.6 kg of styrene. 16.6 g of pulverulent graphite (Graphitwerk Kropfmühl KG, UF2 96/97), i.e. 0.1% of graphite based on the total amount of styrene and EPS, are homogeneously suspended in the solution and 83.0 g of dicumyl peroxide, 4.15 g of dibenzoyl peroxide and 112.033 g of hexabromocyclododecane (HBCD) are added. The organic phase is introduced into 19.3 l of deionized water in a 50 l stirred vessel. The aqueous phase comprises 46.127 g of sodium pyrophosphate and 86.348 g of magnesium sulfate (Epsom salts). The suspension is heated to 80° C. over a period of 140 minutes. 2.32 g of emulsifier K 30/40 (Bayer AG) are then added. After a further 40 minutes, 1330 g of pentane are metered in and the polymerization is completed at 126° C.

Separating off the aqueous phase gives homogeneously grayish beads having a mean diameter of 1.18 mm. Prefoaming the beads twice using steam results in a bead density of 10.0 g/l. The internal water content is <1.5% and the residual styrene content is <1000 ppm. The prefoamed beads are welded together by means of steam to give foam blocks. The thermal conductivity at a density of 10 g/l (Poensgen method) is 42 mW/m·K.

EXAMPLE 2 COMPARISON

Example 1 was repeated without addition of graphite. The thermal conductivity at a density of 10 g/l was 44 mW/m·K.

EXAMPLE 3

In a pressure-resistant stirred vessel, a mixture of 150 parts of deionized water, 0.1 part of sodium pyrophosphate, 100 parts of styrene, 0.45 part of benzoyl peroxide, 0.15 part of tert-butyl perbenzoate and 5 parts of Kropfmühl graphite powder UFZ 99.5, 2 parts of hexabromocyclododecane (HBCD) and 0.4 part of dicumyl peroxide was heated to 90° C. while stirring.

After 2 hours at 90° C., 4 parts of a 10% strength aqueous solution of polyvinylpyrrolidone were added.

The mixture was then stirred for another 2 hours at 90° C. and 7 parts of a mixture of 80% of n-pentane and 20% of iso-pentane were added. The mixture was subsequently stirred for 2 hours at 110° C. and finally for 2 hours at 140° C.

The expandable polystyrene beads obtained were washed with deionized water, sieved to 0.7–1.0 mm and subsequently dried using warm air.

The beads were prefoamed by treatment with flowing steam and, after storage for one day, were welded together in a closed mold by means of further treatment with steam to give foam blocks having a density of 15 g/l.

The measurement of the thermal conductivities was carried out at 10° C. in accordance with DIN 52612. A value of 34 mW/m·K was obtained.

EXAMPLE 4

2.55 kg of polystyrene (PS 158 K from BASF) are dissolved in 17.03 kg of styrene. 196 g of pulverulent graphite (Graphitwerk Kropfmühle KG, UF2 96/97), i.e. 6% of graphite based on the total amount of styrene and polystyrene, are homogeneously suspended in the solution and 59.6 g of dicumyl peroxide and 20.4 g of dibenzoyl peroxide are added. The organic phase is introduced into 19.5 l of deionized water in a 50 l stirred vessel. The aqueous phase comprises 69.8 g of sodium pyrophosphate and 129.5 g of magnesium sulfate. 195.8 g of pentane are metered into the suspension which is then heated to 80° C. After 140 minutes, 3.51 g of emulsifier K 30/40 (Bayer AG) are added. After a further 30 minutes, another 1175.1 g of pentane are metered in and polymerization is completed at 134° C. Separating off the aqueous phase gives homogeneously dark beads having a mean diameter of 0.82 mm. The beads can be foamed using steam to give a density of 10.2 g/l after 3 minutes. The measurement of the thermal conductivity was carried out on foam blocks at 10° C. in accordance with DIN 52 612. The result is shown in Table 1.

EXAMPLE 5

Example 4 was repeated using 4% of graphite.

EXAMPLE 6

Example 4 was repeated using 2% of graphite.

EXAMPLE 7

Example 4 was repeated using 1% of graphite.

EXAMPLE 8

Example 4 was repeated using 0.5% of graphite.

EXAMPLE 9

Example 4 was repeated using 0.2% of graphite.

EXAMPLE 10

Comparison

Example 4 was carried out without addition of graphite.

TABLE 1

| Example | Graphite % | Density g/l | Thermal conductivity mW/m · K |
|---|---|---|---|
| 4 | 6 | 10.2 | 32 |
| 5 | 4 | 10.0 | 33 |
| 6 | 2 | 10.5 | 35 |
| 7 | 1 | 10.8 | 36 |
| 8 | 0.5 | 10.2 | 38 |
| 9 | 0.2 | 10.0 | 40 |
| 10 | — | 10.2 | 44 |

EXAMPLE 11

Example 4 was repeated with 127 g of hexabromocyclododecane and 85 g of bicumyl being added as flame retardant system. The polymerization was carried out at 125° C. A thermal conductivity of 34 mW/m·K was obtained. The fire protection class B2 was achieved.

EXAMPLES 12 to 14

Polystyrene having a mean molecular weight ($M_w$) of 220,000 (PS 148 H BASF) and containing 2.1% of HBCD and 0.42% of bicumyl was plasticized at 180° C. with addition of the amount of graphite indicated in Table 1 as a 20% strength masterbatch in polystyrene in a heated twin-screw extruder and extruded through a die plate having 1 mm diameter orifices. The extrudates were solidified in a water bath and subsequently granulated to a particle size of 2×2×2 mm by means of rotating knives.

6000 g of these granules together with 21,300 g of deionized water, 76 g of sodium pyrophosphate, 155 g of magnesium sulfate heptahydrate and 50 g of a 40% strength solution of an alkylbenzenesulfonate (Mersolat K 30, Bayer AG) were placed in a 50 l capacity stirred vessel.

The vessel was closed and heated to 120° C. while stirring at 250 rpm. After this temperature had been reached, 500 g of a mixture of 80% of n-pentane and 20% of iso-pentane were injected into the vessel over a period of 15 minutes and the mixture was stirred for another 6 hours at 120° C. The expandable beads obtained were washed, sieved to 0.7–1 mm, dried and processed to form foam blocks. At a density of 10.1 g/l, a thermal conductivity of 32 mW/m·K was obtained. The B2 test was passed.

In Example 13, the flame retardant was left out. The B2 test was not passed.

In Comparative Example 14, the graphite was left out. The thermal conductivity was 43 mW/m·K.

EXAMPLES 15 to 18

In a heated twin-screw extruder, 2% of graphite and 5.0% of a mixture of 80% of n-pentane and 20% of iso-pentane were metered into molten polystyrene having a mean molecular weight ($M_w$) of 220,000 and containing 2.1% of HBCD and 0.42% of bicumyl at a melt temperature of about 160° C. The homogenized mixture was, at a melt temperature of 180° C., extruded through a die plate having 0.8 mm diameter orifices. An underwater granulator was fitted to the die plate. The melt coming out of the die was granulated at a pressure of 5 bar by means of a rotating knife. Beads having a diameter of 1.5 mm were obtained.

In Example 15, foaming was carried out to a density of 10.3 g/l and in Example 16 (shorter steam treatment time) to a density of 15 g/l. The thermal conductivities were 34 and 32 mW/m·K, respectively. The B2 test was passed in each case.

In Example 17, the flame retardant was left out and in Comparative Example 18 both the flame retardant and the graphite were left out.

The thermal conductivities were 34 and 44 mW/m·K, respectively. The B2 test was not passed in either case.

EXAMPLE 19

Polystyrene PS 158 K (BASF AG) was metered into a twin-screw extruder (ZSK 53) together with 2% of graphite, 1.4% of HBCD and 0.7% of bicumyl. In addition, 5% of pentane was mixed into the melt in the extruder. The melt leaving the extruder die was granulated by means of an underwater granulator from Gala (USA). Granulation was carried out under a pressure of 5 bar. This pressure was achieved by means of a throttle (hose having a length of 50 m) installed between granulation and dryer. This gave bead-like black granules having a mean diameter of about 1.5 mm. Moldings produced by foaming and sintering of the foam particles had a density of 13 g/l and a thermal conductivity of mW/m·K.

COMPARATIVE EXAMPLE 20

Surface Coating with Graphite

In a mixing apparatus, prefoamed EPS beads were admixed with 2.0% of graphite. Incomplete coating and nonuniform distribution of the graphite on the bead surface were observed. During further processing, considerable rubbing-off of the graphite from the bead surface occurred. Use of binders (glyceryl stearate, white oil) was not able to achieve any qualitative improvement in the coating results. The welding together to form moldings was unsatisfactory.

What is claimed is:

1. A particulate expandable styrene polymer which can be processed to give foams having a density of $\leq 35$ g/l and contains from 0.05 to 8% by weight of homogeneously distributed graphite particles having a mean particle size of from 1 to 50 μm.

2. A particulate expandable styrene polymer as claimed in claim 1 which contains an organic bromine compound having a bromine content of $\geq 70\%$ by weight as flame retardant and can be processed to give self-extinguishing foams which pass the burning test B2 (in accordance with DIN 4102).

3. A particulate expandable styrene polymer as claimed in claim 1 which contains from 0.6 to 5% by weight, based on the polymer, of an organic bromine compound having a bromine content of $\geq 70\%$ by weight as flame retardant and from 0.1 to 1.0% by weight, based on the polymer, of a C—C- or O—O-labile organic compound as flame retardant synergist.

4. A particulate expandable styrene polymer as claimed in claim 3, wherein the organic bromine compound is selected from the group consisting of brominated aliphatic, cycloaliphatic and aromatic compounds.

5. A particulate expandable styrene polymer as claimed in claim 3, wherein the flame retardant synergist is bicumyl or dicumyl peroxide.

6. A particulate expandable styrene polymer as claimed in claim 1 which contains from 3 to 10% by weight of a hydrocarbon having from 3 to 10 carbon atoms as blowing agent.

7. A process for producing an expandable styrene polymer as claimed in claim 1, which comprises mixing graphite particles and blowing agent with molten polystyrene in an extruder and then extruding the melt and cooling and granulating it.

8. A process for producing an expandable styrene polymer as claimed in claim 1, which comprises mixing graphite particles with molten polystyrene containing blowing agent in an extruder and then extruding the melt and cooling and granulating it.

9. A process for producing an expandable styrene polymer as claimed in claim 1, which comprises mixing graphite particles with molten polystyrene in an extruder, then extruding the melt and cooling and granulating it and subsequently impregnating the granules in aqueous suspension with blowing agents.

10. A process for producing polystyrene foams, which comprises foaming expandable styrene polymers as claimed in claim 1 containing graphite particles to a density of $\leq 35$ g/l.

11. An expanded polystyrene foam having a density of $\leq 35$ g/l, containing from 0.05 to 8% by weight of homogeneously distributed graphite particles having a mean particle size of from 1 to 50 μm and having a thermal conductivity which is reduced sufficiently for the foam to meet the requirements of thermal conductivity class 035 (in accordance with DIN 18164, Part 1, Table 4).

12. An expanded polystyrene foam as claimed in claim 11 having a density of $\leq 35$ g/l and containing, in each case based on the polymer,

| | |
|---|---|
| from 2 to 8% | by weight of graphite particles, |
| from 0.6 to 5% | by weight of an organic bromine compound having a bromine content of $\geq 70\%$ by weight, and |
| from 0.1 to 1.0% | by weight of a C—C— or O–O—labile compound, | which is self-extinguishing and meets the burning test B2 (in accordance with DIN 4102) and whose thermal conductivity is reduced sufficiently for it to meet the requirements of the thermal conductivity class 035 (in accordance with DIN 18 164, Part 1, Table 4).

13. A particulate expandable styrene polymer as claimed in claim 1, wherein the graphite particles have a size of 2.5 to 12 µm.

14. A particulate expandable styrene polymer as claimed in claim 4, wherein the organic bromine compound is hexabromocyclododecane, pentabromomonochlorocyclohexane or pentabromophenyl allyl ether.

15. A method of providing buildings with thermal insulation, comprising:

insulating said buildings with the expanded styrene polymer of claim 11.

16. A method of constructing buildings, comprising:

in the construction of said buildings, employing structural materials fabricated from the expanded styrene polymer of claim 11.

17. A method of providing machines with thermal insulation, comprising:

insulating said machines with the expanded styrene polymer of claim 11.

18. A method of fabricating domestic appliances, comprising:

assembling said domestic appliances from parts made from the expanded styrene polymer of claim 11.

19. A method of manufacturing packaging materials, comprising:

manufacturing said packaging materials with the expanded styrene polymer of claim 11.

* * * * *